(12) United States Patent
Libby (10) Patent No.: US 7,171,667 B2
(45) Date of Patent: Jan. 30, 2007

(54) SYSTEM AND METHOD FOR ALLOCATING RESOURCES BASED ON LOCALLY AND GLOBALLY DETERMINED PRIORITIES

(75) Inventor: Vibeke Libby, Woodside, CA (US)

(73) Assignee: AgileMath, Inc., Woodside, CA (US)

( * ) Notice: Subject to any disclaimer, the term of this patent is extended or adjusted under 35 U.S.C. 154(b) by 774 days.

(21) Appl. No.: 10/313,066

(22) Filed: Dec. 6, 2002

(65) Prior Publication Data

US 2004/0111724 A1    Jun. 10, 2004

(51) Int. Cl.
*G06F 9/46* (2006.01)

(52) U.S. Cl. .................................. 718/104; 718/103

(58) Field of Classification Search ............. 718/100, 718/102–104
See application file for complete search history.

(56) References Cited

U.S. PATENT DOCUMENTS 6,185,221 B1 *  2/2001  Aybay ..................... 370/412

* cited by examiner

*Primary Examiner*—Meng-Ai T. An
*Assistant Examiner*—Kenneth Tang
(74) *Attorney, Agent, or Firm*—Morgan, Lewis & Bockius LLP (57) ABSTRACT

Resources are allocated in response to requests submitted for a set of entities. Each request has an associated value and resources required to satisfy the request. For each entity, local priority values are provided for prioritizing among the requests received for the entity. The priority values for every entity conforms to the same normalization rule. With respect to each entity, the system selects a set of best requests in accordance with the corresponding set of local priority values, the values associated with the requests, and the resources required to satisfy each request. A scarcity factor is determined for each resource. A score is determined for each selected best request in accordance with the value associated with each request, the resources required to satisfy the request, the scarcity factors for the resources, and a set of global priority values. The system selects a request having a best score.

24 Claims, 6 Drawing Sheets

Request Data Structure

FIG. 3A

Local Priorities

FIG. 3B

Global State

SYSTEM AND METHOD FOR ALLOCATING RESOURCES BASED ON LOCALLY AND GLOBALLY DETERMINED PRIORITIES

The present invention relates generally to computer implemented systems for allocating resources among competing requests, and particularly to a resource allocation system that takes into account both local priorities and global priorities when making resource allocations in response to competing requests.

BACKGROUND OF THE INVENTION

There is often tension between the resource allocation priorities of local managers or decision makers and the resource allocation priorities of "higher management" or central planners. Balancing the requests of competing local managers, especially when demand greatly exceeds available resources, is often difficult.

Applying only a globally determined set of priorities to a set of competing requests tends to produce unsatisfactory results "on the ground" because the central managers may not be as aware of local conditions and priorities as the local managers. Applying only locally determined priorities is also unsatisfactory for a number of reasons, including failure to take into account the value of those resources most in demand, failure to take into account the relative urgency of the requests by different local managers, and failure to take into account other aspects of the global state of the system.

Examples of situations in which it is necessary to allocate resources among competing requests, include allocation of corporate resources among geographically distributed sites. The corporate resources may be for product development or research, advertising campaigns, real estate development, and so on. The resources to be allocated using a resource allocation system may include transportation resources, equipment resources (e.g., permanent allocation, or allocations of use in units of time), monetary and non-monetary resources, governmental resources, military resources, human resources (the time of people and groups of people), natural resources, and so on.

SUMMARY OF THE INVENTION

In summary, the present invention is a system and method for allocating resources in response to requests submitted by or for a set of entities. Each request has an associated value and a specified set of resources required to satisfy the request. For each entity, the system receives a respective set of local priority values for prioritizing among the requests in the set of requests received for the entity. The respective set of priority values for every entity conforms to a same normalization rule, thereby preventing any entity from giving all its requests highest priority. The system also receives a set of global priority values.

With respect to each entity, one or more local selection modules of the system select a set of best requests in accordance with the set of local priority values received for the entity, the value associated with each request in the set of requests received for the entity, and the specified set of resources required to satisfy each request in the set of requests received for the entity.

One or more global selection modules of the system determine a scarcity factor for each resource specified by at least one of the selected best requests, and determine a score for each selected best request in accordance with the value associated with the request, the resources required to satisfy the request, the scarcity factors for the resources, and the global priority values. The one or more global selection modules then select a request to grant, from among the selected best requests, having a best score.

In another aspect of the invention, each request received from an entity has an associated category, and the set of priority values received for each entity include a respective set of priority values for each category in the set of categories for which at least one request has been received for the entity. The one or more local selection modules of the system select, with respect to each entity, a best request for each category in which at least one request has been received for the entity, the best request for each category being selected in accordance with the value associated with each request and the resources required to satisfy the request.

In another aspect of the system and method, the resources specified in the granted request are allocated accordingly.

In another aspect of the system and method, each granted request is removed from the set of requests for the entity for which the granted request was received, and then the steps of selecting a best request for each category, determining a scarcity factor, determining a score and selecting a request are repeated.

In yet another aspect of the system and method, an entity state is associated with each request, each request being applicable only when the entity for which the request was received is in the entity state associated with the request. The step of receiving a set of global priority values includes receiving a coefficient for each distinct entity state and receiving an indication of a current entity state for each entity in the set of entities for which at least one request has been received. The step of selecting a best request for each category, with respect to each entity, includes filtering out all requests not applicable to the current entity state of each entity, and the step of determining a score for each selected best request includes determining the score in accordance with the coefficient for each entity's current entity state.

In another aspect of the system and method, cost information corresponding to each of the resources specified in at least one of the received requests is utilized when selecting the best request for each category.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

Figure 1:
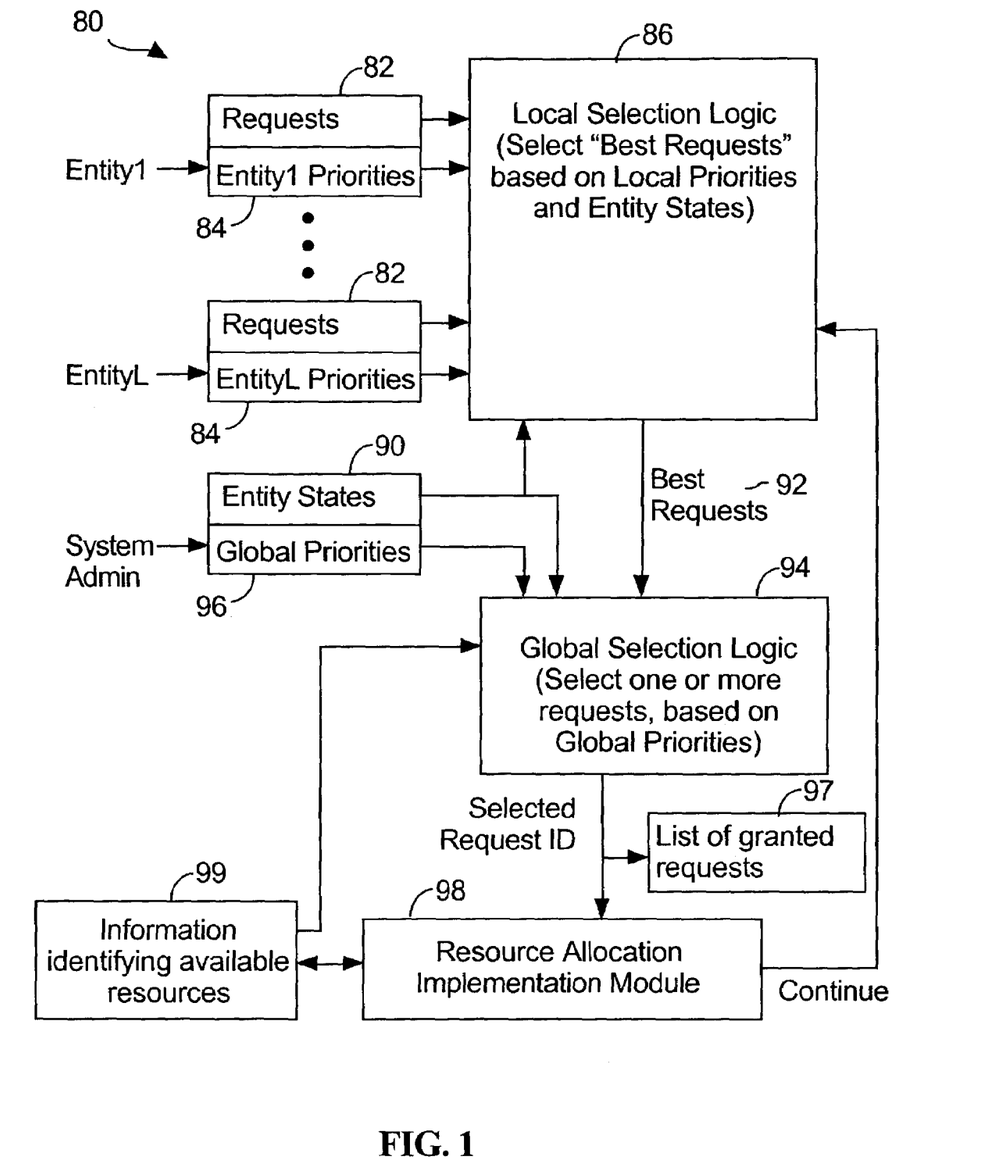
FIG. 1 is a conceptual block diagram of a resource allocation system having local selection logic and global selection logic for applying locally determined priorities and global priorities to the selection of requests and the allocation of resources.

FIG. 1 depicts a conceptual representation of a resource allocation system 80 in accordance with an embodiment of the present invention. A group of entities (Entity1 to EntityL) submit requests 82 and locally determined priorities 84 to the local selection logic or module 86 of the resource allocation system. Alternately, the requests 82 and local priorities 84 for an entity may be submitted indirectly, such as by an agent representing the interests of the entity.

The entities may be the different divisions of a company, governmental organization or non-governmental organization, working groups at different locations; managers of different plants or groups, whether at different locations or the same location or a combination thereof. Generally, the entities are competitors for resources, some of which may be plentiful and some of which are in short supply (i.e., where demand exceeds supply). Each request 82 specifies a set of requested resources, and a value of the request to the requesting entity. In some implementations, each request may also indicate a category associated with the request, and may also indicate a mode of operation (also called an entity state) to which it is applicable.

An example of categories for a mail distribution system might include high priority packages, low priority packages, high priority letters, special services letters, low priority letters, and general mail handling. In this example, the entities might be mail distribution and handling centers. The resources would be the types of transportation equipment not permanently allocated to any one mail center. Other types of resources that might be the subject of requests would be preprinted forms, office supplies, money for buying and replacing equipment, and so on. The modes of operation for the mail centers might include seasonal and weather related modes, as well as special modes for mail centers having unusually large or small mail loads.

The local selection logic 86 also receives information 90 about the current state of the entities making resource requests. The entity state information 90, which may represent a current mode of operation of the entities, may be received from a system administrator, or may be received directly from the entities themselves. The local selection logic 86 selects the "best requests" 92 from among the submitted requests 82 based on the information in the requests themselves, the local priority information 84 received from (or on behalf of) the entities, and the entity state information 90. In other embodiments, other information may also be used by the local selection logic 86 to select the best requests 92. The best requests (also called the selected requests or the locally selected requests) are those which, in light of the local priorities and entity state information, represent the requests from each entity having the highest value, or the highest value per resource used. This is discussed in more detail below with respect to a particular embodiment.

Global selection logic or module 94 receives the best requests 92 and a set of global priorities 96 and selects one or more requests to which resources are to be allocated. The global priorities 96, which may be provided by a system administrator, are generally mathematical representations of system-wide or organization-wide priorities. Such global priorities 96 can be specified in a number of different ways, one of which is to specify a numerical coefficient or priority level for each distinct predefined entity state. Alternately, global priorities may be based on other known characteristics of the entities, such as the volume of pending work to be done by the entities, promises made to customers that must be satisfied by particular entities, and so on.

The request or requests selected by the global selection logic 94, which may be called granted requests, are added to a list of granted requests 97, and may also be processed by a resource allocation implementation module 98 that takes steps to allocate the resources specified by the granted request or requests. Information about the available resources 99 is preferably updated by the resource allocation implementation module 98 to take into account resources already allocated to granted requests.

If the available resources have not been exhausted by the granted requests, the request selection process may be repeated, taking into account which requests have already been granted.

Figure 2:
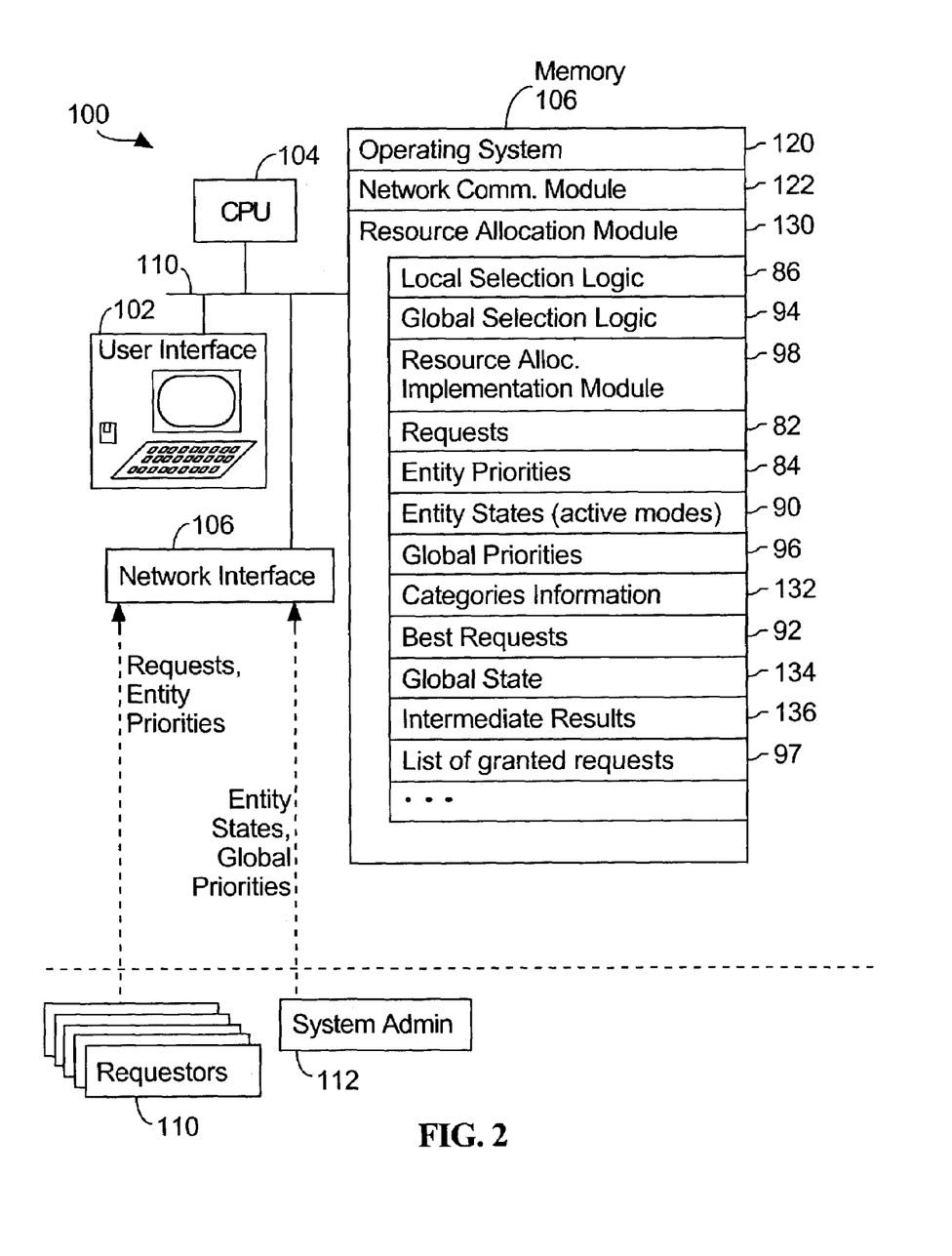
FIG. 2 is a block diagram of a computer system for implementing a resource allocation system.

In a preferred embodiment, the resource allocation system is implemented using one or more computer systems 100, as schematically shown in FIG. 2. The computer system 100 will typically have a user interface 102, one or more processing units (CPU's) 104, a network or other communications interface 106, memory 108, and one or more communication busses 110 for interconnecting these components. Memory 108 may include high speed random access memory and may also include non-volatile memory, such as one or more magnetic disk storage devices. Memory 108 may include mass storage that is remotely located from the central processing unit(s) 104. The memory 108 preferably stores:

- an operating system 120 that includes procedures for handling various basic system services and for performing hardware dependent tasks;
- a network communication module 122 that is used for connecting the system 100 to various client computers 110, 112 (e.g., client computers 110 used by entities submitting requests and local priority information, and client computers 112 used by system administrators) and other servers via one or more communication networks, such as the Internet, other wide are networks, local area networks, metropolitan area networks, and so on; and
- a resource allocation module 130, for implementing many of the main aspects of the present invention.

The resource allocation module 130 may include executable procedures, sub-modules, tables and other data structures. In a preferred embodiment, the resource allocation module 130 includes:

- a local selection logic module 86, for selecting the most important or "best" requests based on information in the requests, local entity status information, and optionally based on local priorities;
- a global selection logic module 94, for selecting a single request, or a subset of requests, from among the requests selected by the local selection logic module 86, based on both local priorities and global priorities;
- optionally, a resource allocation implementation module 98, for allocating resources based on the granted requests; in some embodiments, the resource allocation system 100 only grants requests, and does not handle the actual allocation of resources; and
- tables and data structures used by these modules.

Referring to FIGS. 2, 3A, 3B, 3C, the tables and data structures used by the resource allocation module 130 include:

- requests 82, which are requests for the allocation of resources to the requesting entities;
- entity priorities 84, which are local priorities as specified by the requesting entities;

entity states 90, which indicate the current mode of operation 96 or status of each of the entities that has submitted one or more requests;

global priorities 96, which are system-wide priorities used to help make final selections of which requests to grant;

categories information 132, applicable only to embodiments that categorize requests, identifies the various categories into which requests may be assigned by the requesting entities;

best requests 92 are the requests selected by the local selection logic module 96 as being the best or most important requests;

a global state 134 extends the entity states 90, based on the global priorities 96, to indicate priority factors for each of the entities that has submitted one or more requests;

intermediate results 136 are tables and other structures used to store intermediate values and results computed by the local and global selection logic modules 86, 94; and a list of granted requests 97, which represents the requests granted by the resource allocation module 130.

In other embodiments, additional or different modules and data structures may be used, and some of the modules and/or data structures listed above may not be used.

Resource Allocation Computer System and Data Structures

While FIG. 2 shows the system administrator 112 interacting with the resource allocation computer system 100 for specifying entity states and global priorities, a system administrator may alternately provide information and commands using the user interface 102 of the resource allocation computer system 100. In addition, the entity states may be provided by the requesting entities instead of the system administrator.

Figure 3A:
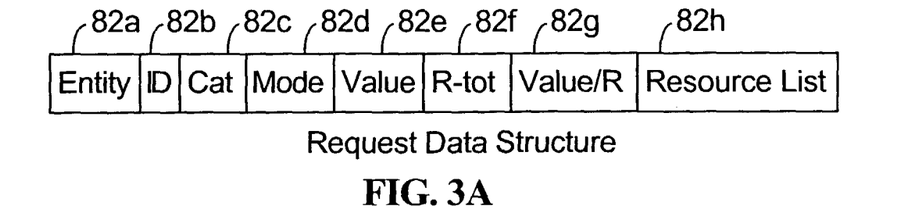
FIGS. 3A, 3B, 3C are block diagrams of data structures used in a preferred embodiment of a resource allocation system.

Requests received from the requesting entities are stored in the resource allocation system in data structures such as the one shown in FIG. 3A. Each stored request 82 preferable includes a set of fields, including:

an requesting entity identifier 82*a*;

a request identifier 82*b*;

in embodiments that categorize requests, a category indicator 82*c* that indicates the category to which the request is assigned;

a mode 82*d*, which indicates the entity mode of operation in which the request is to be considered active;

a value 82*e*, representing the value to the requesting entity of the granting the request;

R-total 82*f*, representing the total quantity of resources being requested, or alternately the total cost of the resources being requested;

value/R 82*g*, representing the ratio of value 82*e* to R-total 82*f*;

resource list 82*h*, which is a list indicating the resources requested and the quantity requested for each requested resource.

In some embodiments, a cost is associated with each unit of each type of resource that can be requested by the entities. These costs may be specified by a cost table stored within the resource allocation module. In these embodiments the R-total 82*f* represents the total cost of the resources requested by a particular request. Alternately, the values in the resource list 82*h* may be scaled in proportion to the cost of the resources being requested.

The values 82*e* for the various requests submitted by an entity may be subject to a budget or other set of constraints, so as to prevent an entity from assigning requests arbitrarily large values so as to win the "bidding war" for resources. In one embodiment, each entity is assigned a budget for each mode of operation, and the total value (i.e., the sum of the values 82*e*) of the requests in each such mode must not exceed the respective assigned budget.

In a preferred embodiment, each request is assigned to a specified category. Furthermore, each requesting entity must submit a distinct set of requests for each potential mode of operation of the entity. For each entity, only the requests having a mode 82*d* matching the current state of the entity are considered to be active requests. Furthermore, in the preferred embodiment, the local selection logic 86 selects the best or most important request in each distinct category.

Some of these fields, such as R-total 82*f* and value/R 82*g* may be computed by the computer system based on information provided in the request represented by the request record 82. Other fields, such as category 82*c* and mode 82*d* may not be used in some embodiments, such as embodiments where requests are not categorized and embodiments where different sets of requests are not required for each potential mode of operation of the requesting entity.

Figure 3B:
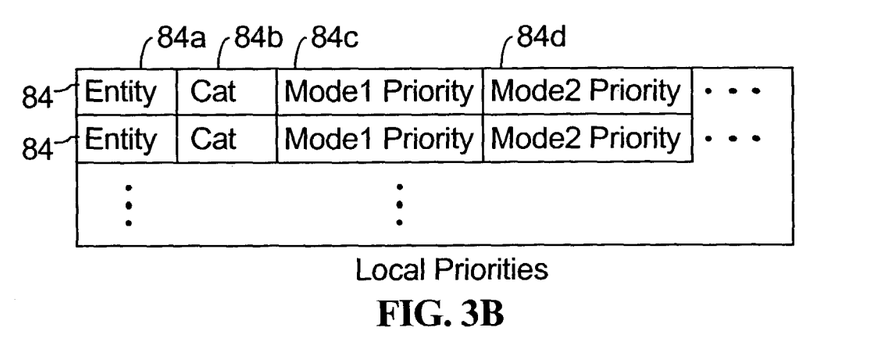

Local priorities, as specified by the requesting entities, may be represented by records 84, as shown in FIG. 3B. For each entity, the local priority record 84 includes fields for indicating the entity 84A, a request category 84*b*, and a priority level 84*c*, 84*d* for that category for each potential mode of operation of the entity. Thus, if there are N defined categories of requests, there will be up to N local priority records 84 for each entity. Furthermore, the set of priority records 84 for each entity must conform to a normalization rule that applies to the priority records 84 for every one of the entities. In one example of a normalization rule, the sum of all the specified priorities with respect to any one entity, for all the categories, must be equal to a fixed, predefined value. In other embodiments, the normalization rule may be any appropriate linear or non-linear function that is applied to the set of priority values for each entity, and which must produce a uniform result for all the entities that submit requests.

If the local priorities submitted by an entity do not conform to the normalization rule, the priority values are automatically scaled (up or down, as required) by the resource allocation system, or are replaced by a default set of local priorities, so as to make the local priorities for the entity conform to the normalization rule.

Figure 3C:
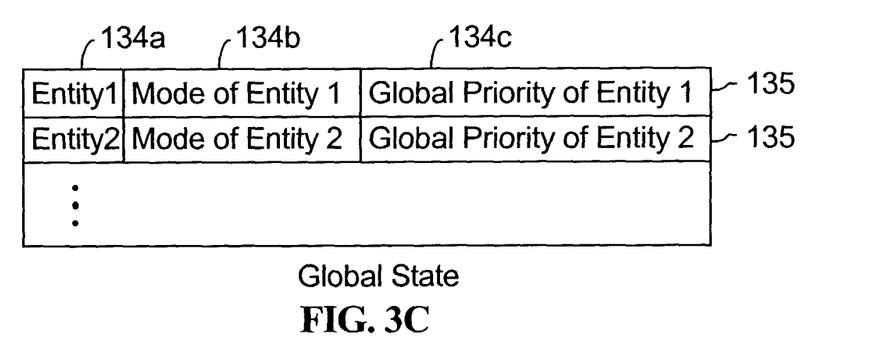

The global state of the system is represented by global state records 135, as shown in FIG. 3C. Each global state record indicates the current mode of operation 134*b* of an entity 134*a*, and furthermore preferably indicates a global priority 134*c* for the entity based on the entity's current mode of operation and the global priorities provided by the system administrator.

Resource Allocation Methodology

Figure 4A:
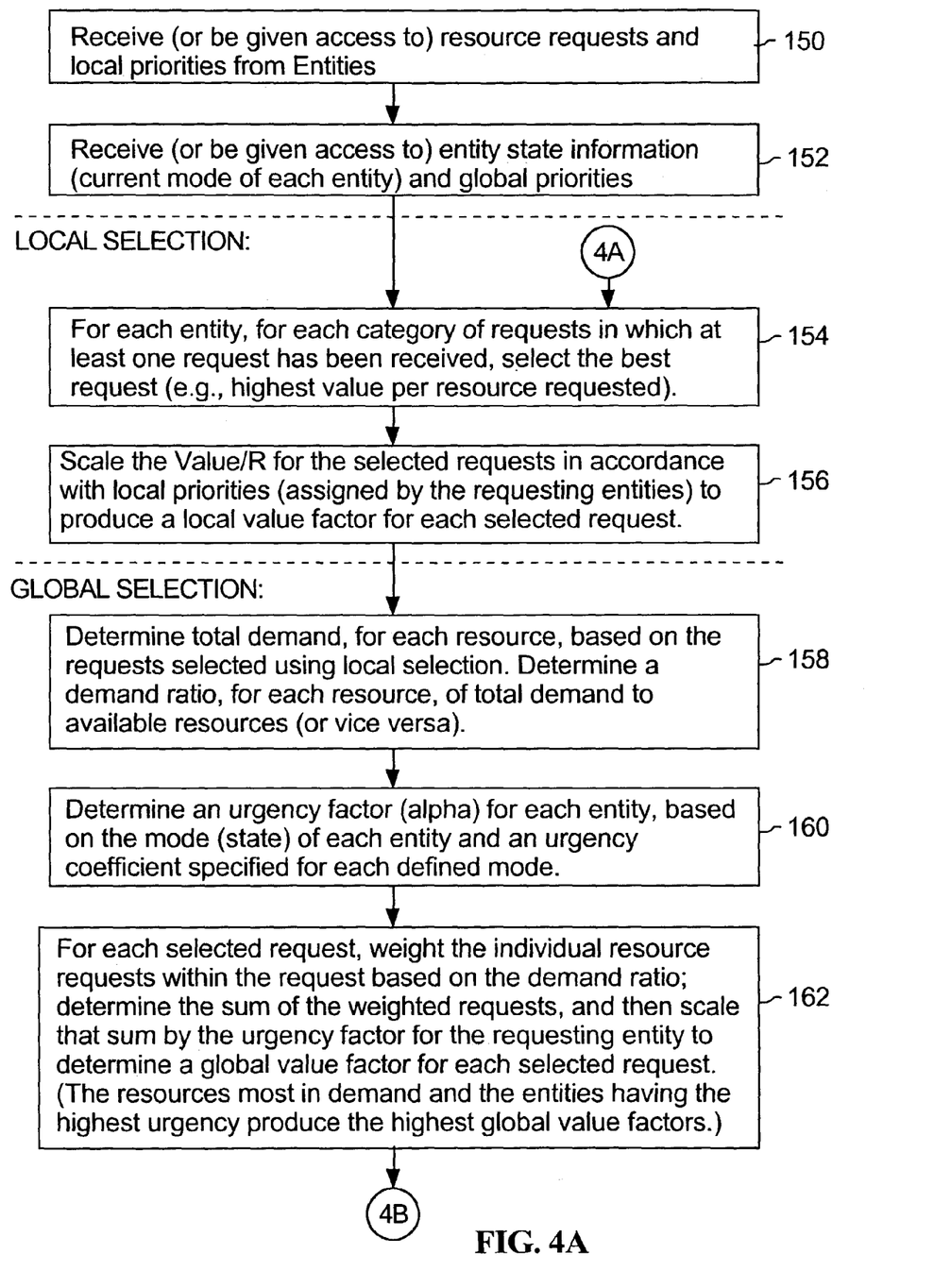
FIGS. 4A and 4B are a flow diagram of a method of resource allocation.
Figure 4B:
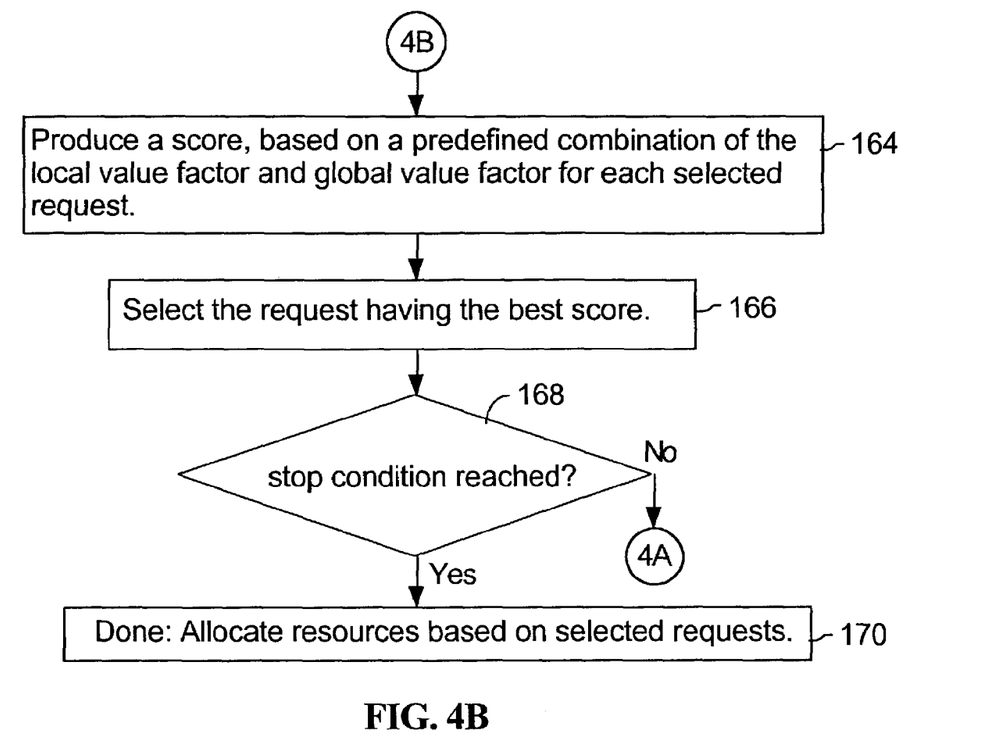
Figure 5:
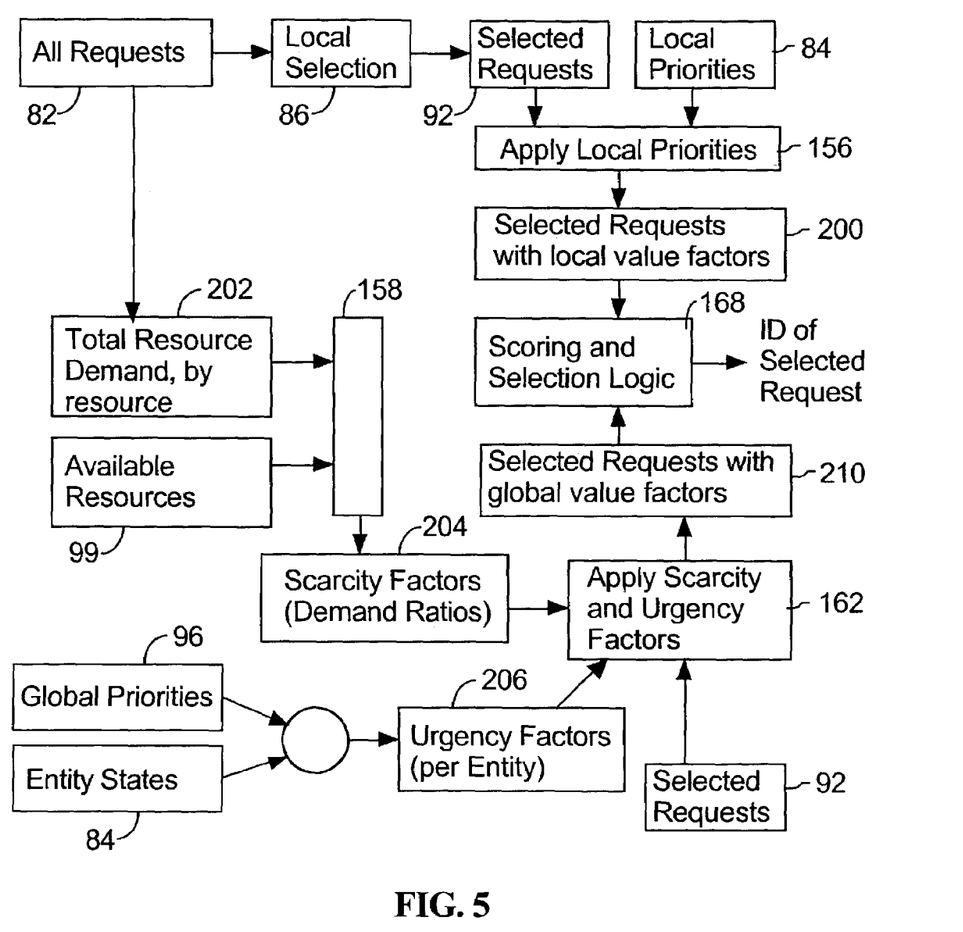
FIG. 5 is a data flow diagram representing data flows in a resource allocation system having local selection logic and global selection logic for applying locally determined priorities and global priorities to the selection of requests and the allocation of resources.

Referring to FIGS. 4A, 4B and 5, a preferred embodiment of the resource allocation method is as follows. The system receives from each of a number of entities, or is given access to, a set of resource requests and a set of local priorities to be applied to these requests (150). A data structure for storing such requests is shown in FIG. 3A and was described above. In addition, the system receives, or is given access to, entity state information (i.e., the current mode of operation of each of the entities) and global priorities (152).

The local selection logic of the system makes initial request selections (154). In particular, for each entity, for each category of requests in which at least one request has been received, the system selects the best (e.g., having the highest Value/R) request. This produces up to E*N best requests, where E is the number of entities and N is the number of categories. In a preferred embodiment, the step of selecting a best request for each category, with respect to each entity, includes filtering out all requests not applicable to the current entity state of each entity. That is, all requests for modes of operation other than the current mode of operation are not candidates for selection by step 154.

In other embodiments, selecting an initial set of best requests may be performed using a variety of other methods. In general, though, all the initially selected requests should be requests having a non-zero chance of being selected by the global selection logic and should be consistent with the current state of the system. In a preferred embodiment, the Value/R field of the initially selected requests are scaled in accordance with the local priorities, as specified by the requesting entities, to produce a local value factor for each selected request (156). This local value factor may be stored in a supplemental field of the request data structure, or in copies of the initially selected requests (200, FIG. 5).

Next, before the global selection logic selects a request to grant, two preliminary steps are performed. Total demand for each resource (202, FIG. 5) is determined (158), based on the initially selected requests. That is, the resource demands in the selected best requests are summed on a resource type by resource type basis. A demand ratio (204, FIG. 5) is also determined for each resource (which may also be called a resource type), which is the ratio of total demand to the quantity of available resources (158). Alternately, the inverse of this ratio may be computed.

In addition, an urgency factor (206, FIG. 5) is computed for each entity, based on the current mode of operation of the entity and an urgency coefficient that is included in the global priorities (160). The global priorities include an urgency coefficient for each defined mode of operation, and those coefficients are used to determine the urgency factor for each entity.

Now, with the preliminary steps taken care of, each of the previously selected requests is processed by the global selection logic (162). In particular, each individual resource request in each request is weighted in accordance with the demand ratio for that request, and then the sum of the weighted resources for each request is determined. The weighted resource sum (for each request) is then scaled by the urgency factor for the requesting entity to determine a global value factor (210, FIG. 5) for each of the selected requests. As a result of applying the global priorities to the previously selected requests, the resources most in demand and the entities having the highest urgency will produce the requests having the highest global value factors.

Next, a score is produced for each selected request (164). In a preferred embodiment, the score for each request is the sum of the local value factor and the global value factor for that request. In other embodiments, the score can be computed using any predefined linear or nonlinear combination of the local value factor and the global value factor. For instance, the score could be computed as $$score = c1*lvf* + c2*lvf*gvf + gvf$$

where lvf is the local value factor, gvf is the global value factor, and c1 and c2 are predefined coefficients.

The request or requests having the best score are selected (166), and these requests are granted. Normally, just one request will granted during each iteration of the method. If a predefined stop condition is reached (168-yes), the method stops and the available resources are allocated in accordance with the granted requests (170). Otherwise (168-No), the method repeats so as to grant one or more additional requests. The resource allocation step 170 may be performed after each request is granted, or after all the request grants have been made. In some embodiments, the method only includes the granting of the best requests, and does not include the actual allocation of resources in accordance with the granted requests.

Alternate Embodiments

The present invention can be implemented as a computer program product that includes a computer program mechanism embedded in a computer readable storage medium. For instance, the computer program product could contain the program modules and data structures shown in FIGS. 1, 2, and 3A–3C. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a transmission medium.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of allocating resources among a set of entities, comprising:
   receiving, for each entity, a set of requests, each request having an associated value and a specified set of resources required to satisfy the request;
   receiving, for each entity, a respective set of local priority values for prioritizing among the requests in the set of requests received for the entity, the respective set of priority values for every entity conforming to a same normalization rule;
   receiving a set of global priority values;
   with respect to each entity, selecting a set of best requests in accordance with the set of local priority values received for the entity, the value associated with each respective request in the set of requests received for the entity, and the specified set of resources required to satisfy each respective request in the set of requests received for the entity;
   determining a scarcity factor for each resource that is specified by at least one of the selected best requests;
   determining a score for each selected best request in accordance with the value associated with each request, the resources required to satisfy the request, the scarcity factors for the resources, and the global priority values;
   selecting a request, from among the selected best requests, having a best score; and
   allocating the resources specified in the selected request.

2. The method of claim 1, further including:
   removing the selected request from the set of requests for the entity for which the request was received;
   repeating the steps of selecting a set of best requests for each entity, determining a scarcity factor, determining a score and selecting a request.

3. The method of claim 1, further including:
associating an entity state with each request, each request being applicable only when the entity for which the request was received is in the entity state associated with the request;
the step of receiving a set of global priority values including receiving a coefficient for each distinct entity state and receiving an indication of a current entity state for each entity in the set of entities for which at least one request has been received;
the step of selecting a best request for each category, with respect to each entity, including filtering out all requests not applicable to the current entity state of each entity; and
the step of determining a score for each selected best request including determining the score in accordance with the coefficient for each entity's current entity state.

4. The method of claim 1, including receiving cost information corresponding to each of the resources specified in at least one of the received requests, and utilizing the cost information when selecting the set of best requests for each entity.

5. The method of claim 1, wherein
each request in the received requests has an associated category; the associated category of each request comprising a member of a set of categories;
the set of local priority values for a respective entity comprise a respective set of priority values for each category in the set of categories for which at least one request has been received for the respective entity; and
selecting a set of best requests for a respective entity comprises selecting a best request for each category in which at least one request has been received for the entity, the best request for each category being selected in accordance with the value associated with each respective request in the set of requests received for the entity, and the specified set of resources required to satisfy each respective request in the set of requests received for the entity.

6. The method of claim 5, further including:
removing the selected request from the set of requests for the entity for which the request was received;
repeating the steps of selecting a best request for each category, determining a scarcity factor, determining a score and selecting a request.

7. The method of claim 5, further including:
associating an entity state with each request, each request being applicable only when the entity for which the request was received is in the entity state associated with the request;
the step of receiving a set of global priority values including receiving a coefficient for each distinct entity state and receiving an indication of a current entity state for each entity in the set of entities for which at least one request has been received;
the step of selecting a best request for each category, with respect to each entity, including filtering out all requests not applicable to the current entity state of each entity; and
the step of determining a score for each selected best request including determining the score in accordance with the coefficient for each entity's current entity state.

8. The method of claim 5, including receiving cost information corresponding to each of the resources specified in at least one of the received requests, and utilizing the cost information when selecting the best request for each category.

9. A system for allocating resources among a set of entities, comprising:
at least one processing unit for executing software modules;
memory for storing, for each entity, a set of requests, each request having an associated value and a specified set of resources required to satisfy the request;
the memory further configured to store, for each entity, a respective set of local priority values for prioritizing among the requests in the set of requests received for the entity, the respective set of priority values for every entity conforming to a same normalization rule;
the memory further configured to store a set of global priority values;
one or more local selection modules, executable by the at least one processing unit, for selecting, with respect to each entity, a set of best requests in accordance with the set of local priority values received for the entity, the value associated with each respective request in the set of requests received for the entity, and the specified set of resources required to satisfy each respective request in the set of requests received for the entity; and
one or more global selection modules, executable by the at least one processing unit, for:
determining a scarcity factor for each resource that is specified by at least one of the selected best requests;
determining a score for each selected best request in accordance with the value associated with each request, the resources required to satisfy the request, the scarcity factors for the resources, and the global priority values; and
selecting a request, from among the selected best requests, having a best score; and
one or more modules for allocating the resources specified by the selected request.

10. The system of claim 9, including:
software, executable by the at least one processing unit, for removing the selected request from the set of requests for the entity for which the request was received, and resuming execution of the one or more local selection modules and the one or more global selection modules so as to select another request and allocation the resources specified in the selected request.

11. The system of claim 9, wherein an entity state is associated with each request, each request being applicable only when the entity for which the request was received is in the entity state associated with the request; and
the set of global priority values include a coefficient for each distinct entity state and an indication of a current entity state for each entity in the set of entities for which at least one request has been received;
the system includes one or more software modules, executable by the at least one processing unit, for filtering out all requests not applicable to the current entity state of each entity; and
the one or more global software modules for determining a score for each selected best request include instructions for determining the score in accordance with the coefficient for each entity's current entity state.

12. The system of claim 9, wherein the one or more local selection modules include instructions for instructions for utilizing cost information, corresponding to each of the resources specified in at least one of the received requests, when selecting the set of best requests for each entity.

13. The system of claim 9, wherein
each request in the received requests has an associated category; the associated category of each request comprising a member of a set of categories;
the set of local priority values for a respective entity comprise a respective set of priority values for each category in the set of categories for which at least one request has been received for the respective entity; and
the set of best requests for a respective entity, to be selected by the one or more local selection modules, comprises a best request for each category in which at least one request has been received for the entity, the best request for each category being selected in accordance with the value associated with each respective request in the set of requests received for the entity, and the specified set of resources required to satisfy each respective request in the set of requests received for the entity.

14. The system of claim 13, including:
software, executable by the at least one processing unit, for removing the selected request from the set of requests for the entity for which the request was received, and resuming execution of the one or more local selection modules and the one or more global selection modules so as to select another request and allocation the resources specified in the selected request.

15. The system of claim 13, wherein
an entity state is associated with each request, each request being applicable only when the entity for which the request was received is in the entity state associated with the request; and
the set of global priority values include a coefficient for each distinct entity state and an indication of a current entity state for each entity in the set of entities for which at least one request has been received;
the system includes one or more software modules, executable by the at least one processing unit, for filtering out all requests not applicable to the current entity state of each entity; and
the one or more global software modules for determining a score for each selected best request include instructions for determining the score in accordance with the coefficient for each entity's current entity state.

16. The system of claim 13, wherein the one or more local selection modules include instructions for instructions for utilizing cost information, corresponding to each of the resources specified in at least one of the received requests, when selecting the best request for each category.

17. A computer program product, comprising a computer readable storage medium having thereon a resource allocation procedure that, when executed by a computer, performs operations comprising:
receiving, for each entity, a set of requests, each request having an associated value and a specified set of resources required to satisfy the request;
receiving, for each entity, a respective set of local priority values for prioritizing among the requests in the set of requests received for the entity, the respective set of priority values for every entity conforming to a same normalization rule;
receiving a set of global priority values;
with respect to each entity, selecting a set of best requests in accordance with the set of local priority values received for the entity, the value associated with each respective request in the set of requests received for the entity, and the specified set of resources required to satisfy each respective request in the set of requests received for the entity;
determining a scarcity factor for each resource that is specified by at least one of the selected best requests;
determining a score for each selected best request in accordance with the value associated with each request, the resources required to satisfy the request, the scarcity factors for the resources, and the global priority values;
selecting a request, from among the selected best requests, having a best score; and
allocating the resources specified in the selected request.

18. The computer program product of claim 17, wherein the operations performed by the resource allocation procedure, when executed by the computer, include:
removing the selected request from the set of requests for the entity for which the request was received; and
repeating the steps of selecting a set of best requests for each entity, determining a scarcity factor, determining a score and selecting a request.

19. The computer program product of claim 17, wherein the operations performed by the resource allocation procedure, when executed by the computer, include:
associating an entity state with each request, each request being applicable only when the entity for which the request was received is in the entity state associated with the request;
wherein
the step of receiving a set of global priority values including receiving a coefficient for each distinct entity state and receiving an indication of a current entity state for each entity in the set of entities for which at least one request has been received;
the step of selecting a best request for each category, with respect to each entity, including filtering out all requests not applicable to the current entity state of each entity; and
the step of determining a score for each selected best request including determining the score in accordance with the coefficient for each entity's current entity state.

20. The computer program product of claim 17, wherein the operations performed by the resource allocation procedure, when executed by the computer, include receiving cost information corresponding to each of the resources specified in at least one of the received requests, and utilizing the cost information when selecting the set of best requests for each entity.

21. The computer program product of claim 17, wherein
each request in the received requests has an associated category; the associated category of each request comprising a member of a set of categories;
the set of local priority values for a respective entity comprise a respective set of priority values for each category in the set of categories for which at least one request has been received for the respective entity; and
the set of best requests for a respective entity, to be selected by the resource allocation procedure, comprises a best request for each category in which at least one request has been received for the entity, the best request for each category being selected in accordance with the value associated with each respective request in the set of requests received for the entity, and the specified set of resources required to satisfy each respective request in the set of requests received for the entity.

22. The computer program product of claim 21, wherein the operations performed by the resource allocation procedure, when executed by the computer, include:
- removing the selected request from the set of requests for the entity for which the request was received;
- repeating the steps of selecting a best request for each category, determining a scarcity factor, determining a score and selecting a request.

23. The computer program product of claim 21, wherein the operations performed by the resource allocation procedure, when executed by the computer, include:
- associating an entity state with each request, each request being applicable only when the entity for which the request was received is in the entity state associated with the request;
- wherein
- the step of receiving a set of global priority values including receiving a coefficient for each distinct entity state and receiving an indication of a current entity state for each entity in the set of entities for which at least one request has been received;
- the step of selecting a best request for each category, with respect to each entity, including filtering out all requests not applicable to the current entity state of each entity; and
- the step of determining a score for each selected best request including determining the score in accordance with the coefficient for each entity's current entity state.

24. The computer program product of claim 21, wherein the operations performed by the resource allocation procedure, when executed by the computer, include receiving cost information corresponding to each of the resources specified in at least one of the received requests, and utilizing the cost information when selecting the best request for each category.

* * * * *